(12) United States Patent
Lin

(10) Patent No.: US 6,647,862 B1
(45) Date of Patent: Nov. 18, 2003

(54) UPPER LID OF A COFFEE MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 4 days.

(21) Appl. No.: 10/134,789

(22) Filed: Apr. 29, 2002

(51) Int. Cl.$^7$ .................................................. A47J 31/00
(52) U.S. Cl. ............................. 99/285; 99/279; 99/293
(58) Field of Search .......................... 99/285, 293, 294, 99/279, 342, 343, 275, 292

(56) References Cited

U.S. PATENT DOCUMENTS 3,282,196 A * 11/1966 Manship et al. ............... 99/285

* cited by examiner

Primary Examiner—Reginald L. Alexander
(74) Attorney, Agent, or Firm—Alan D. Kamrath; Rider Bennett, LLP.

(57) ABSTRACT

The upper lid of a coffee includes an upper lid body, which is provided inside with a rotatable receiving unit having a female-threaded portion and a central through hole. A support post fitted with a prop member is inserted upward through the central through hole of the rotatable receiving unit and fitted around with a safety valve unit. Then, the rotatable receiving unit and the upper lid are combined together, and the top end of the support post is fitted with a warning member movably positioned in the central through hole of the upper lid. Thus, the steam produced by boiling water inside the coffee maker can push up the safety valve body to force the warning member to protrude out of the through hole of the upper lid, manifestly warning a user not to directly open the upper lid to avoid scalded.

1 Claim, 6 Drawing Sheets

UPPER LID OF A COFFEE MAKER

BACKGROUND OF THE INVENTION

This invention relates to an upper lid of a coffee maker, particularly to one provided in the center portion with a safety valve unit able to be moved up by the steam produced by boiling water inside container of a coffee maker and force the warning member on its top to protrude out of the upper lid to warn a user not to open the upper lid directly to avoid scalded by accident.

A conventional coffee maker 10, as shown in FIG. 3, includes a container 20 having a filling opening 201 in a top side and a pressure-releasing revolving button 30 at an outer side, as shown in FIG. 2, and an upper lid 40 rotatably mounted on the filling opening 201. The upper lid 40, as shown in FIG. 1, is formed inside with a receiving space 401 for receiving a rotatable receiving unit 50, which is provided around its peripheral edge with a plurality of lugs 501 respectively having a screw hole. The rotatably receiving unit 50 has a recessed portion 502 at the bottom for a silica gel ring 503 to be fitted therein, and the recessed portion 502 is formed around its inner peripheral wall with a female-threaded portion 504 for rotatably engaging with a male-threaded portion 202 around the outer circumference of the filling opening 201.

In addition, the rotatable receiving unit 50 is provided in the central top with a second recessed portion 505 for orderly receiving a silica gel pad 506, a copper spring supporter 507 and a spring 508. Then, a prop member 509 rests on and secured with the rotatable receiving unit 50 by bolts 60, and afterward, the assembled rotatable receiving unit 50 is combined with the upper lid 40 by means of bolts 70 passing through the screw holes of the lugs 502 of the rotatable receiving unit 50 and then screwed with the corresponding portions of the upper lid 40, as shown in FIG. 2.

In using, the upper lid 40 is rotatably combined with the male-threaded portion 202 of the filling opening 201 after the container is filled in with a proper amount of water, as shown in FIG. 3. Then, turn on power to carry on boiling. After the water in the container 20 is boiled and coffee is brewed, open the liquid outlet and pour out the brewed coffee, timely enabling the pressure inside to release out. Besides, the upper lid 40 has a warning slogan 90 glued on the surface in order to prevent a user from scalded in opening the upper lid 40 and adding water into the container 20. However, scalding to a user's hand is still unavoidable in case the user abruptly opens the upper lid 40 inattentively.

SUMMARY OF THE INVENTION

The objective of this invention is to offer an upper lid of a coffee maker, which includes a rotatable receiving unit formed with a female-threaded portion around the inner wall and having a central through hole inserted upward by a support post fitted with a prop member. The portion of the support post extending to the receiving recess in the top of the rotatable receiving unit is fitted with a pressure-releasing valve unit. Then, the rotatable receiving unit and the upper lid are combined together, and the support post has its top end fitted with a warning member movably positioned in the central through hole of the upper lid. Thus, the steam produced by boiling water inside the container of a coffee maker enables the interior safety valve unit to move up and force its top warning member to protrude out of the through hole of the upper lid, manifestly reminding a user of the high-pressured steam inside the coffee maker and warning him/her not to open the upper lid directly to avoid scalded.

BRIEF DESCRIPTION OF DRAWINGS

This invention will be better understood by referring to the accompanying drawings, wherein.

DETAILED DESCRIPTION OF THE PREFERRED EMBODIMENT

Figure 5:
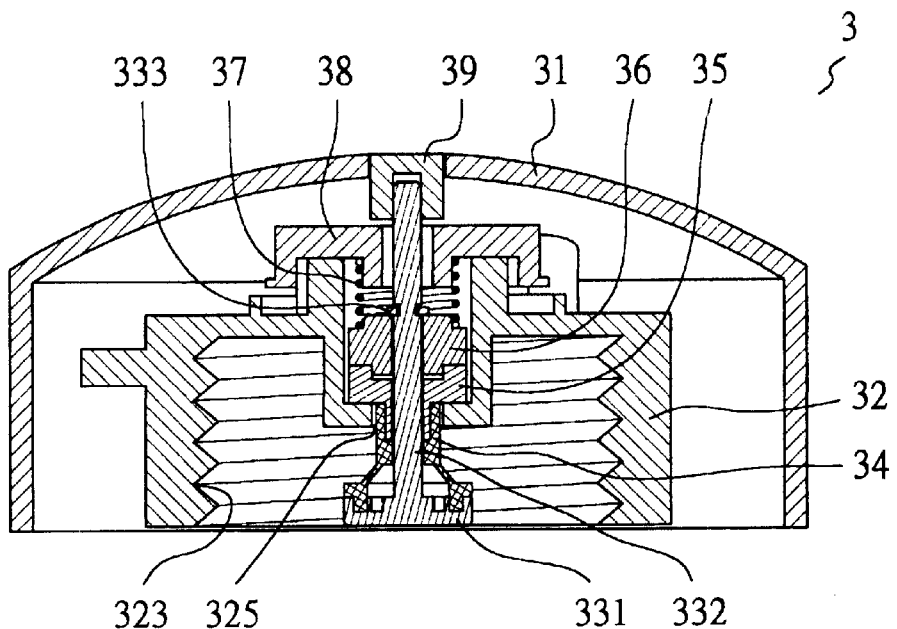
FIG. 5 is a cross-sectional view of the upper lid of a coffee maker in the present invention.
Figure 6:
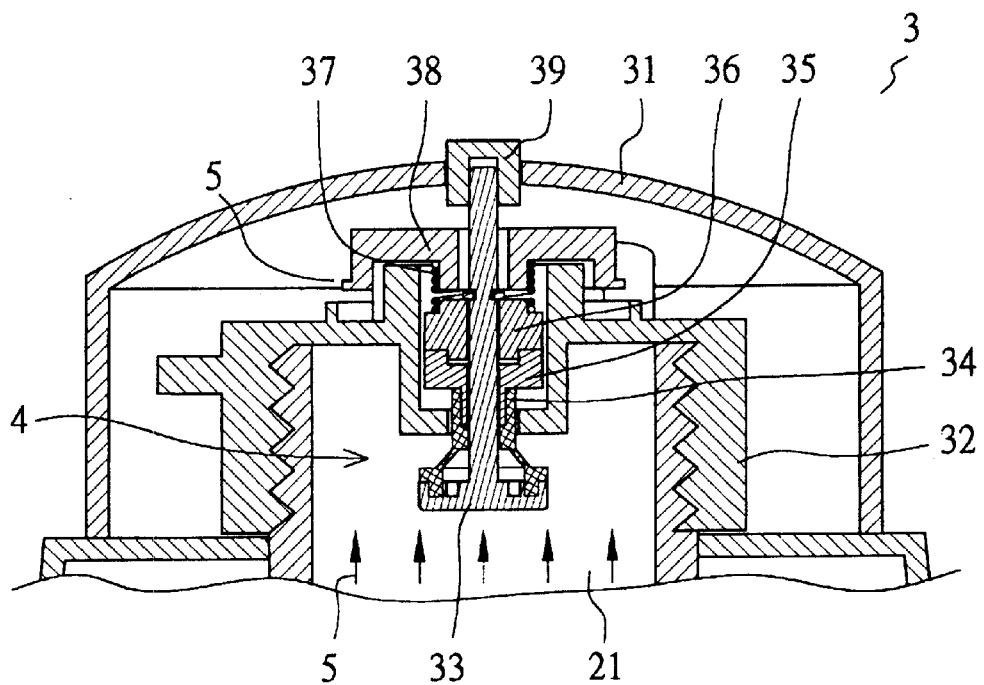
FIG. 6 is a cross-sectional view of the upper lid of a coffee maker in the present invention, with a pressure-releasing valve unit and a warning member of the upper lid pushed up by the boiling steam inside the container of a coffee maker.
Figure 7:
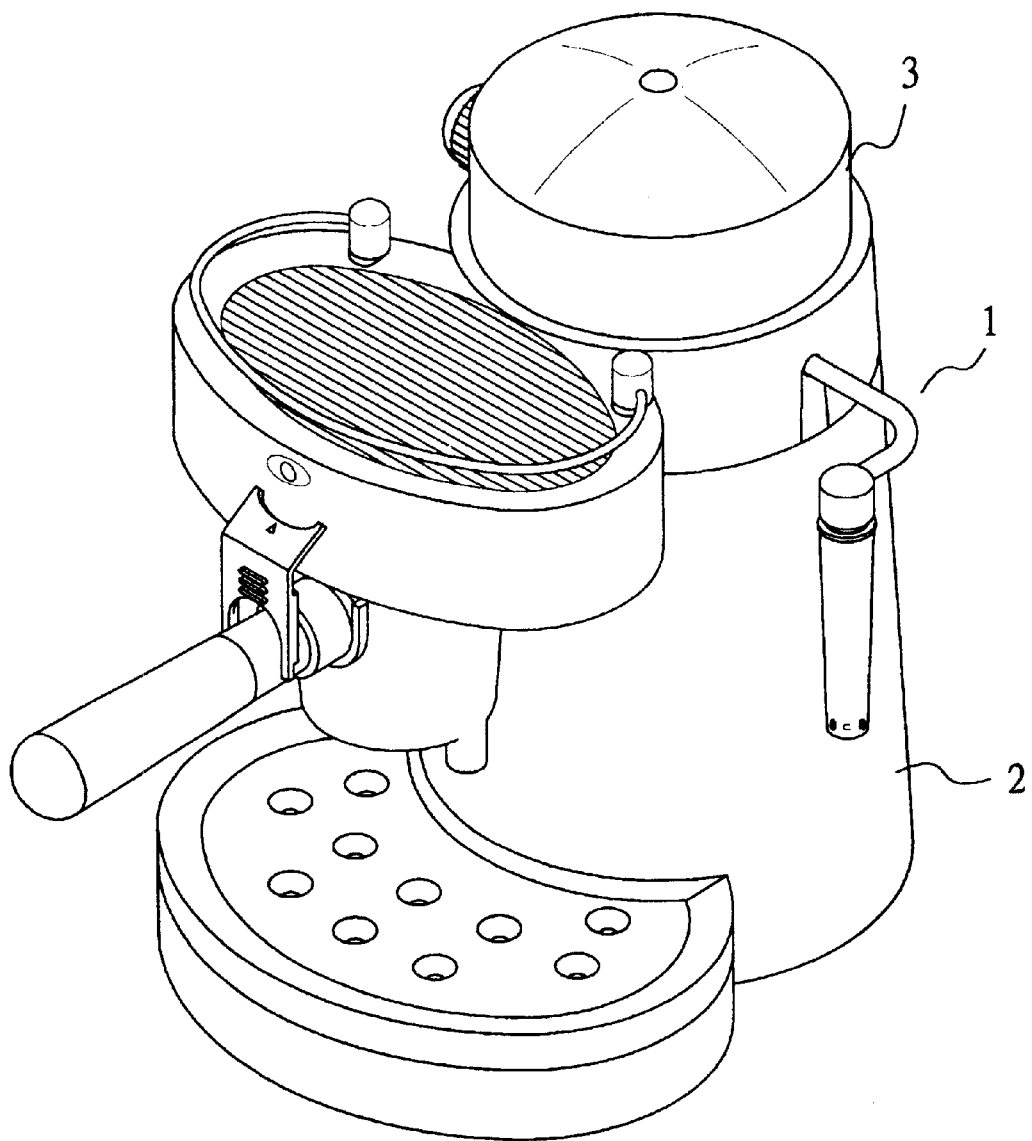
FIG. 7 is a perspective view of the coffee maker in the present invention.

A preferred embodiment of the upper lid of a coffee maker in the present invention, as shown in FIGS. 5 and 7, mainly includes an upper lid body 3 to be rotatably mounted on a filling opening 21 in the top of a container 2. The upper lid body 3 is composed of an upper lid 31, a rotatable receiving unit 32, a support post 33, a prop member 34, a silica gel ring 35, a spring supporter 36, a compress spring 37, a safety upper base 38 and a warning member 39.

The upper lid 31 is formed with a receiving space 311 in the interior and a through hole 312 in the top center.

The rotatable receiving unit 32 is provided around its outer periphery with a plurality of lugs 321 spaced apart equidistantly and respectively having a screw hole 322, a female-threaded portion 323 in an annular inner wall, and a receiving recess 324 in the top side. The receiving recess 324 has a through hole 325 bored in the center and an annular protruding-up wall 326 defining the through hole 325.

The support post 33 with a preset length has a support base 331 formed at its bottom and having a relatively large outer diameter, and an annular groove 332 provided at a proper location.

The prop member 34 is a hollow conical tube made of silica gel, having its disk-like bottom end 341 to be engaged with the support base 331 of the support post 33, and its tubular portion 342 to be inserted therethrough by the support post 33.

The silica gel ring 35 has a lower projecting edge 351 to be tightly inserted in a tubular portion 342 of the prop member 34, an intermediate tubular portion 352 provided for the support post 33 to be inserted therethrough, and a recess 353 formed in the top side.

The spring supporter 36 made of copper is formed with a central hole 363 and two projecting mounting portions 361, 362 respectively on top and at the bottom. The lower mounting portion 362 is tightly fitted in the recess 353 of the silica gel ring 35, while the upper mounting portion 361 is closely mounted with the lower end of the compress spring 36.

The safety upper base 38 is bored with a central hole 381 for the support post 33 to pass therethrough and provided under with a support member 382 for the top end of the compress spring 37 to fit around, having a recessed face 383 formed around the periphery of the support member 382 for an annular peripheral edge 326 of the rotatable receiving unit 32 to be closely engaged therein.

The warning member 39 is formed with a lower recess 391 for receiving the top end of the support post 33.

Figure 1:
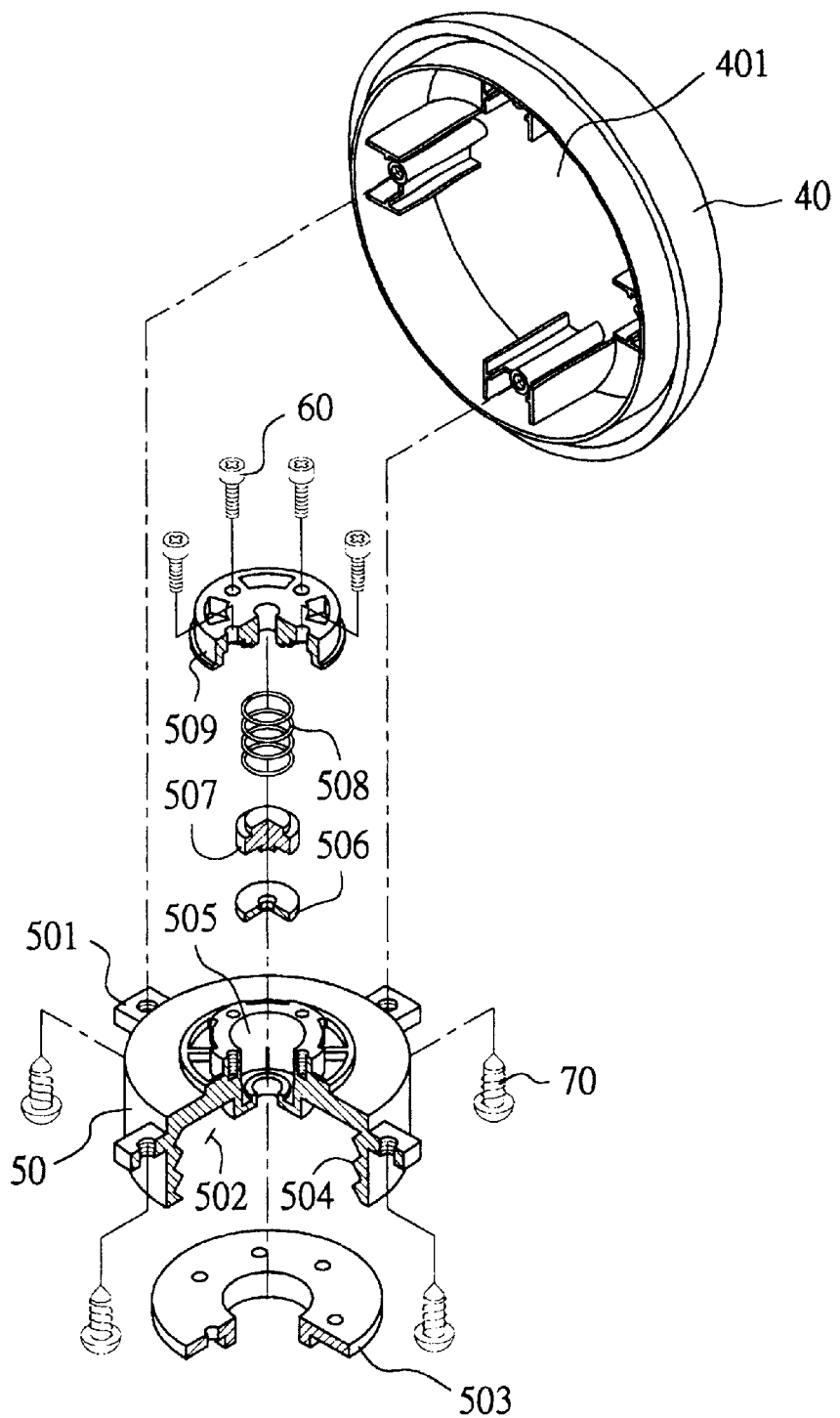
FIG. 1 is an exploded perspective view of the upper lid of a conventional coffee maker.
Figure 2:
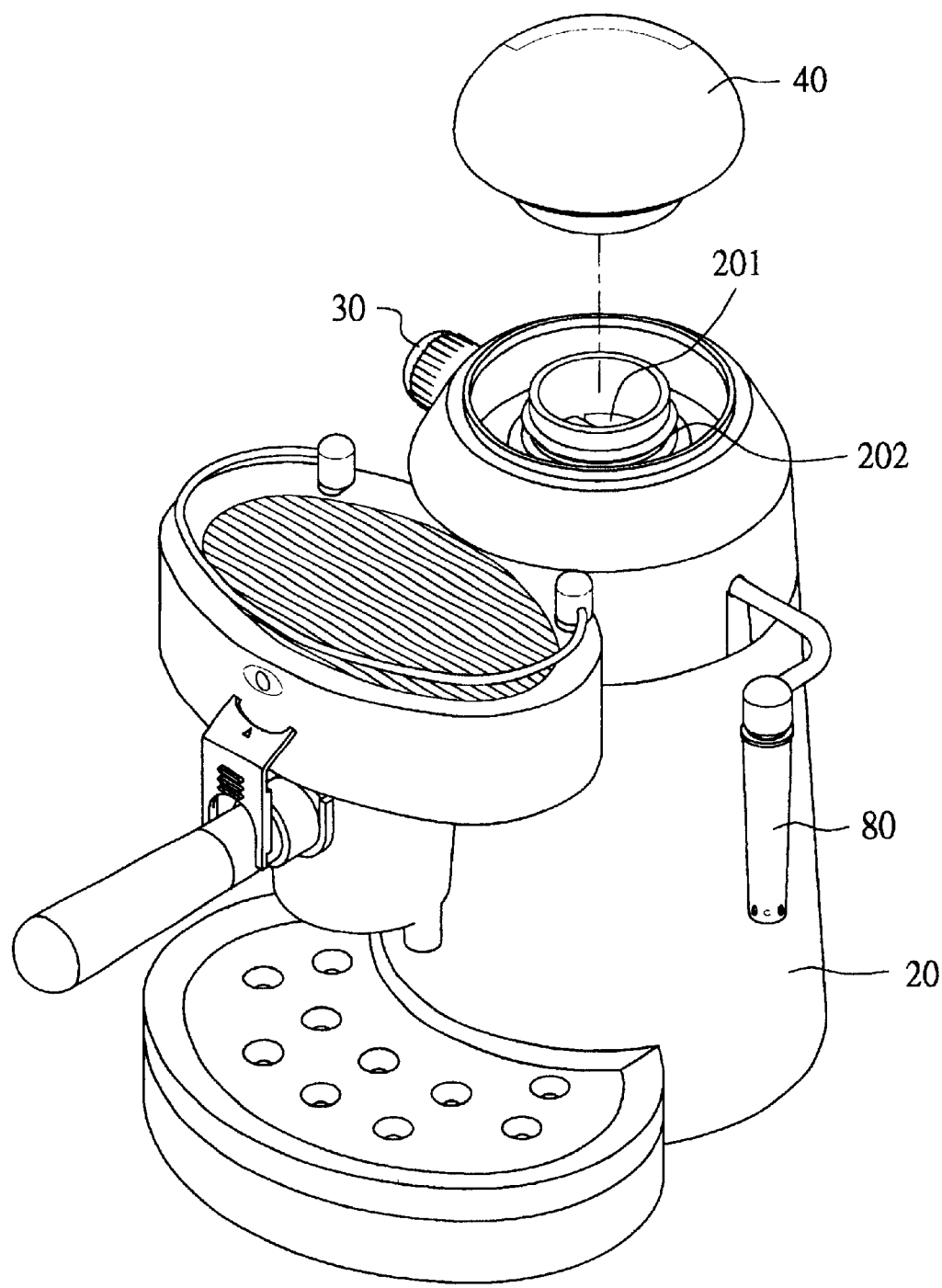
FIG. 2 is a perspective view of the conventional coffee maker with its upper lid separated from its container.
Figure 3:
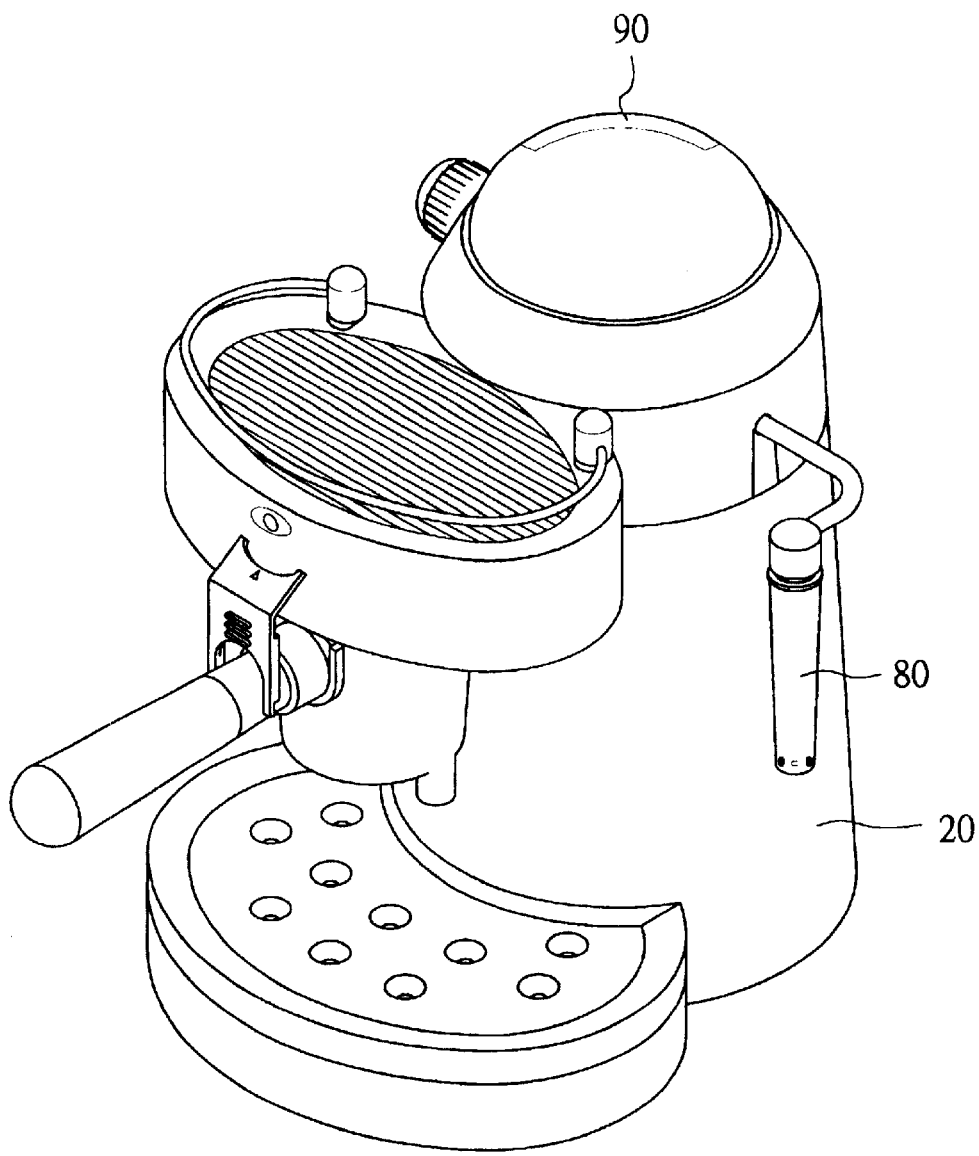
FIG. 3 is a perspective view of the conventional coffee maker.
Figure 4:
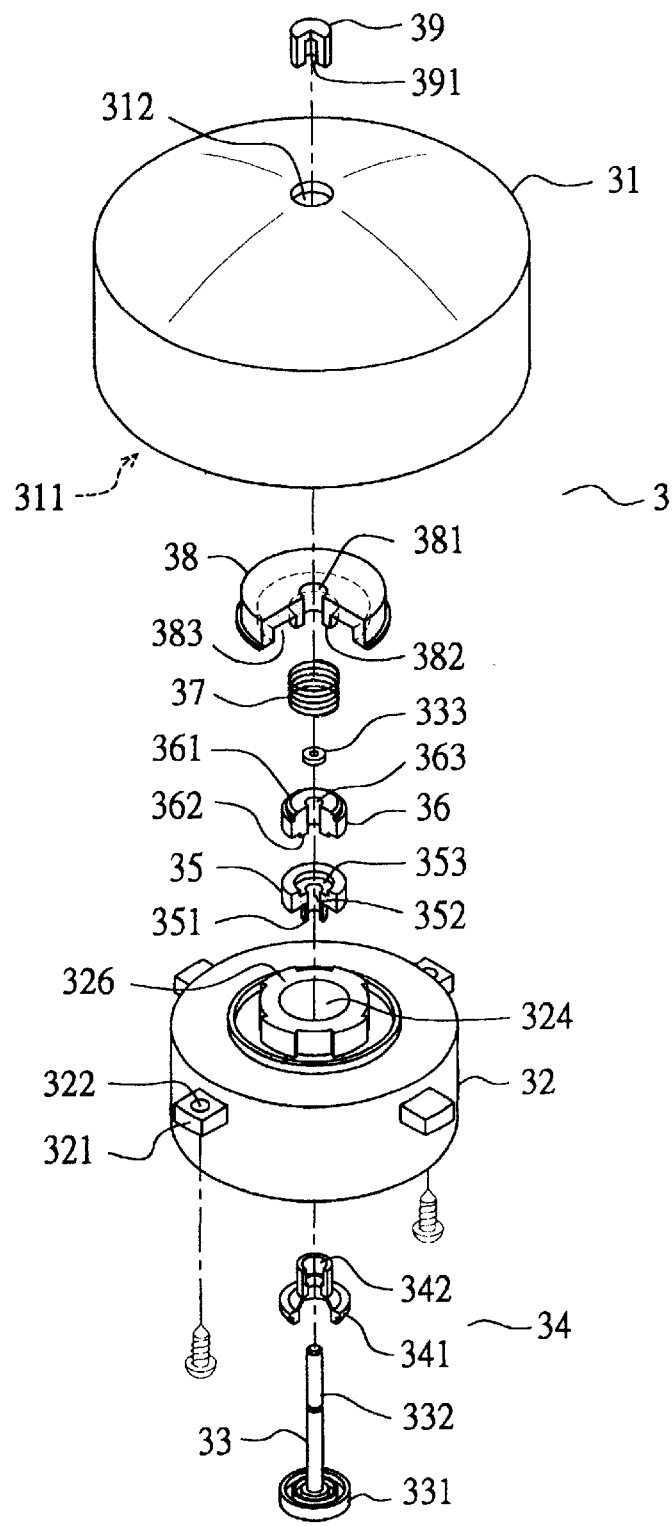
FIG. 4 is an exploded perspective view of an upper lid of a coffee maker in the present invention.

In assembling, as shown in FIGS. 4 and 5, firstly, the support post 33 fixed with the prop member 34 is inserted upward through the central through hole 325 of the rotatable receiving unit 32, and the section of the support post 33 between the support base 331 and the receiving recess 324 of the rotatable receiving unit 32 is orderly fitted around with the silica gel ring 35, the spring supporter 36 and the spring 37, with the silica gel ring 35 and the spring supporter 36 secured in position by a C-shaped clasp 333 locked around the annular groove 332 of the support post 33, and with the bottom end of the spring 37 tightly engaged with the upper mounting portion 361 of the spring supporter 36.

Next, the safety top base 38 is mounted on the annular peripheral edge 326 of the rotatable receiving unit 32, having its downward support member 382 fitted with the top end of the spring 37. Lastly, the top end of the support post 33 is combined with a warning member 39 movably positioned in the central through hole 312 of the upper lid 31.

In using, the upper lid 3 is rotatably mounted around the filling opening 21 after the container 2 of a coffee maker is filled in with a proper amount of water. Then, turn on power to carry on boiling, and in due time the steam 5 produced by boiling water inside the container can push up the safety valve unit 4 to make the top warning member 39 protrude out of the through hole 312 of the upper lid 31 so as to manifestly remind a user of the hot high-pressured steam inside the coffee maker and warn him/her not to open the upper lid 31 directly to avoid scalded by accident.

While the preferred embodiment of the invention has been described above, it will be recognized and understood that various modifications may be made therein and the appended claims are intended to cover all such modifications that may fall within the spirit and scope of the invention.

I claim:

1. An upper lid of a coffee maker comprising an upper lid body to be rotatably mounted around a filling opening of a container of a coffee maker, said upper lid formed with a receiving space for receiving a rotatable receiving unit having a female-threaded portion in a lower portion, said rotatable receiving unit fitted with a resilient pushing-up unit in its central through hole: and, characterized by a support post with a support base inserted through a through hole of a protruding-up annular edge in the center of said rotatable receiving unit, the portion of said support post between said support base and a receiving recess in a top side of said rotatably receiving unit orderly fitted around with a silica gel ring, a spring supporter and a compress spring, said compress spring having its bottom end engaged with an upper mounting portion of said spring supporter, a safety upper base resting on said protruding-up annular edge of said rotatable receiving unit, said safety upper base provided in the center with a support member protruding downward for engaging a top end of said compress spring, said support post having its top end combined with a warning member, said warning member movably positioned in a through hole bored in the top center of said upper lid:
   steam produced by boiling water inside the container of a coffee maker pushing up said safety valve unit, said top warning member synchronously forced to protrude out of said through hole of said upper lid, said protruding-out warning member reminding a user of hot high-pressured steam inside the coffee maker and warning him/her not to open said upper lid directly.

* * * * *